US011355806B2

United States Patent
Fujii et al.

(10) Patent No.: US 11,355,806 B2
(45) Date of Patent: Jun. 7, 2022

(54) BATTERY UNIT

(71) Applicant: HONDA MOTOR CO., LTD., Tokyo (JP)

(72) Inventors: Ryo Fujii, Saitama (JP); Ryo Kitano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 378 days.

(21) Appl. No.: 16/707,708

(22) Filed: Dec. 9, 2019

(65) Prior Publication Data
US 2020/0194751 A1   Jun. 18, 2020

(30) Foreign Application Priority Data
Dec. 17, 2018   (JP) .............................. JP2018-235761

(51) Int. Cl.
*H01M 10/625* (2014.01)
*H01M 10/6556* (2014.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC .. H01M 50/20; H01M 10/613; H01M 10/625; H01M 10/6556; H01M 50/572; H01M 2220/20
See application file for complete search history.

(56) References Cited

U.S. PATENT DOCUMENTS

2003/0029149 A1*   2/2003   Fillman .................. A01D 34/58
56/10.6
2004/0155749 A1*   8/2004   Fujii .................. H01H 85/2035
337/187
(Continued)

FOREIGN PATENT DOCUMENTS

CN   102082303 A   6/2011
CN   203013874 U   6/2013
(Continued)

OTHER PUBLICATIONS

JP 2012126267 MT (Year: 2012).*
(Continued)

*Primary Examiner* — Alexander Usyatinsky
(74) *Attorney, Agent, or Firm* — Paratus Law Group, PLLC

(57) ABSTRACT

A vehicle includes a battery unit which has a first battery pack and a second battery pack that is disposed above the first battery pack. The first battery pack includes a battery module; and a first battery case body and a first battery case cover that house the battery module. The second battery pack includes a battery module; and a second battery case body and a second battery case cover that house the battery module. The second battery case body houses a power shutdown portion configured to shut down an electric circuit of the battery unit; a cover removal restricting portion configured to restrict removal of the second battery case cover; and an interlock mechanism configured to disable release of the cover removal restricting portion unless the electric circuit is shut down by the power shutdown portion. The second battery case cover includes an opening accessible to the interlock mechanism.

8 Claims, 7 Drawing Sheets

(51) Int. Cl.
*H01M 50/572* (2021.01)
*H01M 50/20* (2021.01)
*H01M 10/613* (2014.01)

(52) U.S. Cl.
CPC ..... *H01M 10/6556* (2015.04); *H01M 50/572* (2021.01); *H01M 2220/20* (2013.01)

(56) References Cited

U.S. PATENT DOCUMENTS

| | | | |
|---|---|---|---|
| 2007/0080662 A1* | 4/2007 | Wu | B60L 58/18 320/110 |
| 2010/0071979 A1* | 3/2010 | Heichal | B60L 53/11 180/68.5 |
| 2010/0112843 A1* | 5/2010 | Heichal | B60K 1/04 439/299 |
| 2011/0127855 A1 | 6/2011 | Kim | |
| 2011/0223459 A1* | 9/2011 | Heichal | H01M 50/20 403/33 |
| 2012/0212882 A1* | 8/2012 | Barkoczi | B60L 50/64 361/637 |
| 2012/0326665 A1* | 12/2012 | Yin | B60L 58/27 429/100 |
| 2015/0207130 A1* | 7/2015 | Maguire | B60L 3/04 429/97 |
| 2016/0087319 A1* | 3/2016 | Roh | H01M 10/647 429/62 |
| 2016/0160533 A1* | 6/2016 | Fujii | E05B 65/006 70/164 |
| 2016/0240833 A1* | 8/2016 | Yang | H01M 50/561 |
| 2016/0346573 A1* | 12/2016 | Carson | A62C 3/16 |
| 2016/0355100 A1* | 12/2016 | Ito | H01M 10/625 |
| 2018/0248159 A1 | 8/2018 | Kim et al. | |
| 2019/0081364 A1* | 3/2019 | Capati | H05K 1/111 |

FOREIGN PATENT DOCUMENTS

| | | | |
|---|---|---|---|
| CN | 108028337 A | | 5/2018 |
| JP | 2012-126267 A | | 7/2012 |
| JP | 2012126267 | * | 7/2012 |
| JP | 2014044854 | * | 3/2014 |
| JP | 2014157741 | * | 8/2014 |
| WO | WO 2010125602 | * | 10/2011 |

OTHER PUBLICATIONS

JP2014157741MT (Year: 2014).*
Decision to grant a Patent issued by JPO for Application No. JP 2018235761 (Year: 2020).*
Feb. 8, 2022, Chinese Office Action issued for related CN Application No. 201911299433.0.

* cited by examiner

BATTERY UNIT

CROSS-REFERENCE TO RELATED APPLICATIONS

This application is based on and claims priority under 35 USC 119 from Japanese Patent Application No. 2018-235761 filed on Dec. 17, 2018.

TECHNICAL FIELD

The present invention relates to a battery unit mounted on an electric vehicle or the like.

BACKGROUND ART

In related art, a large-capacity battery pack is mounted on an electric vehicle or the like. The battery pack houses a plurality of battery modules and a high-voltage circuit in a case. The case includes a case body and a cover, and is applied with safety measures so that the cover cannot be removed and the high voltage circuit inside the case cannot be accessed unless a predetermined procedure is performed. For example, JP-A-2012-126267 discloses a structure including a service plug capable of switching on/off of a high-voltage circuit by being inserted or removed, in which fitting of a cover and a case body cannot be released in a state where the service plug is inserted, and fitting of the cover and the case body is released in a case where the service plug is removed.

According to JP-A-2012-126267, the cover of the battery pack cannot be opened unless the service plug is removed and the high-voltage circuit is turned off, so that inadvertent access to the high voltage circuit that is electrically connected can be prevented.

SUMMARY OF INVENTION

Technical Problem

Corresponding to increase in capacity of batteries, recently, it has been studied to place separate battery packs above and below in a two-story manner. In this case as well, it is necessary to perform safety measures so as not to access the high voltage circuit, and it is desirable that an operator can easily perform power shutdown processing.

SUMMARY

An aspect of the present invention provides a battery unit capable of easily performing power shutdown processing.

An embodiment of the present invention relates to a battery unit which includes a first battery pack and a second battery pack that is disposed above the first battery pack, in which the first battery pack includes:
a battery module; and
a first battery case body and a first battery case cover that house the battery module,
in which the second battery pack includes:
a battery module; and
a second battery case body and a second battery case cover that house the battery module,
in which the second battery case body houses:
a power shutdown portion configured to shut down an electric circuit of the battery unit;
a cover removal restricting portion configured to restrict removal of the second battery case cover; and
an interlock mechanism configured to disable release of the cover removal restricting portion unless the electric circuit is shut down by the power shutdown portion, and
in which the second battery case cover includes an opening accessible to the interlock mechanism.

According to the above embodiment of the present invention, the number of power shutdown portions may be one, and power shutdown processing of an operator is facilitated.

DESCRIPTION OF EMBODIMENTS

Figure 1:
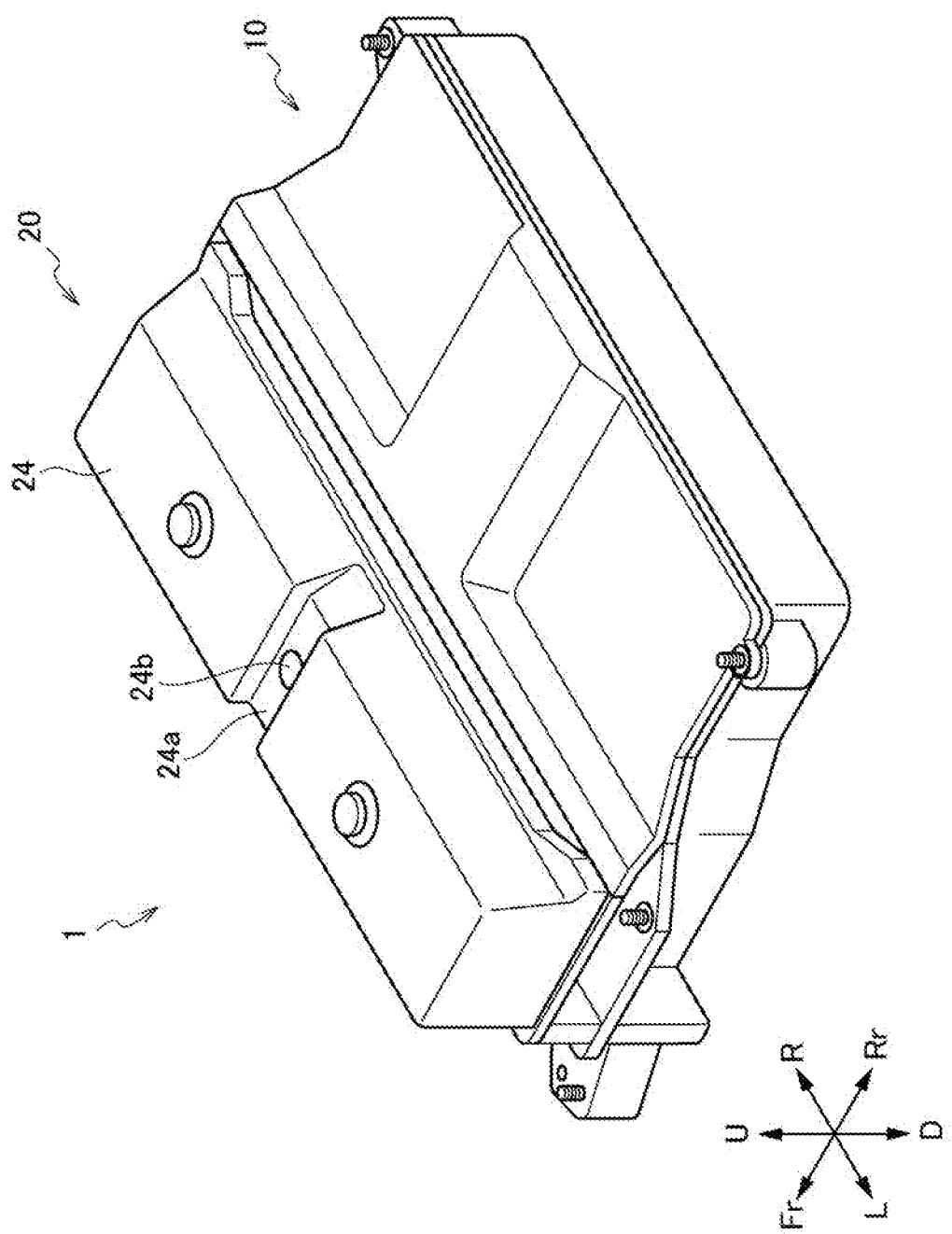
FIG. 1 is a perspective view of a battery unit according to an embodiment of the present invention.

Hereinafter, an embodiment of a battery unit according to the present invention will be described with reference to the accompanying drawings. In the drawings, a front side of the battery unit is denoted by Fr, a rear side is denoted by Rr, a left side is denoted by L, a right side is denoted by R, an upper side is denoted by U, and a lower side is denoted by D. The front, rear, left, right, upper, and lower sides of the battery unit are independent of front, rear, left, right, and upper, and lower sides of a vehicle on which the battery unit is mounted.

(Battery Unit)

Figure 2:
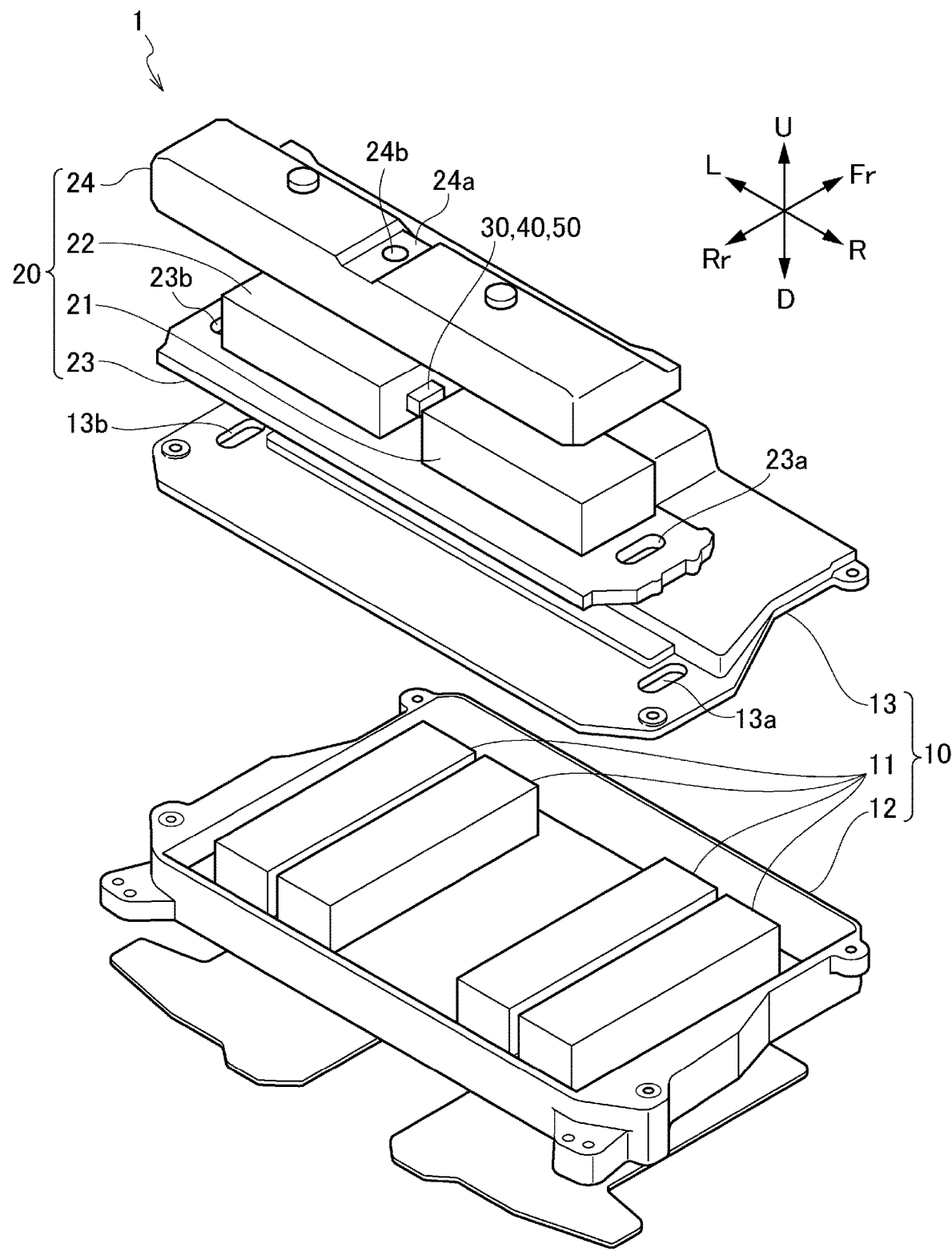
FIG. 2 is an exploded perspective view of the battery unit of FIG. 1.

As shown in FIGS. 1 and 2, the battery unit 1 of the present embodiment includes a first battery pack 10 and a second battery pack 20 that is disposed above the first battery pack 10.

Figure 3:
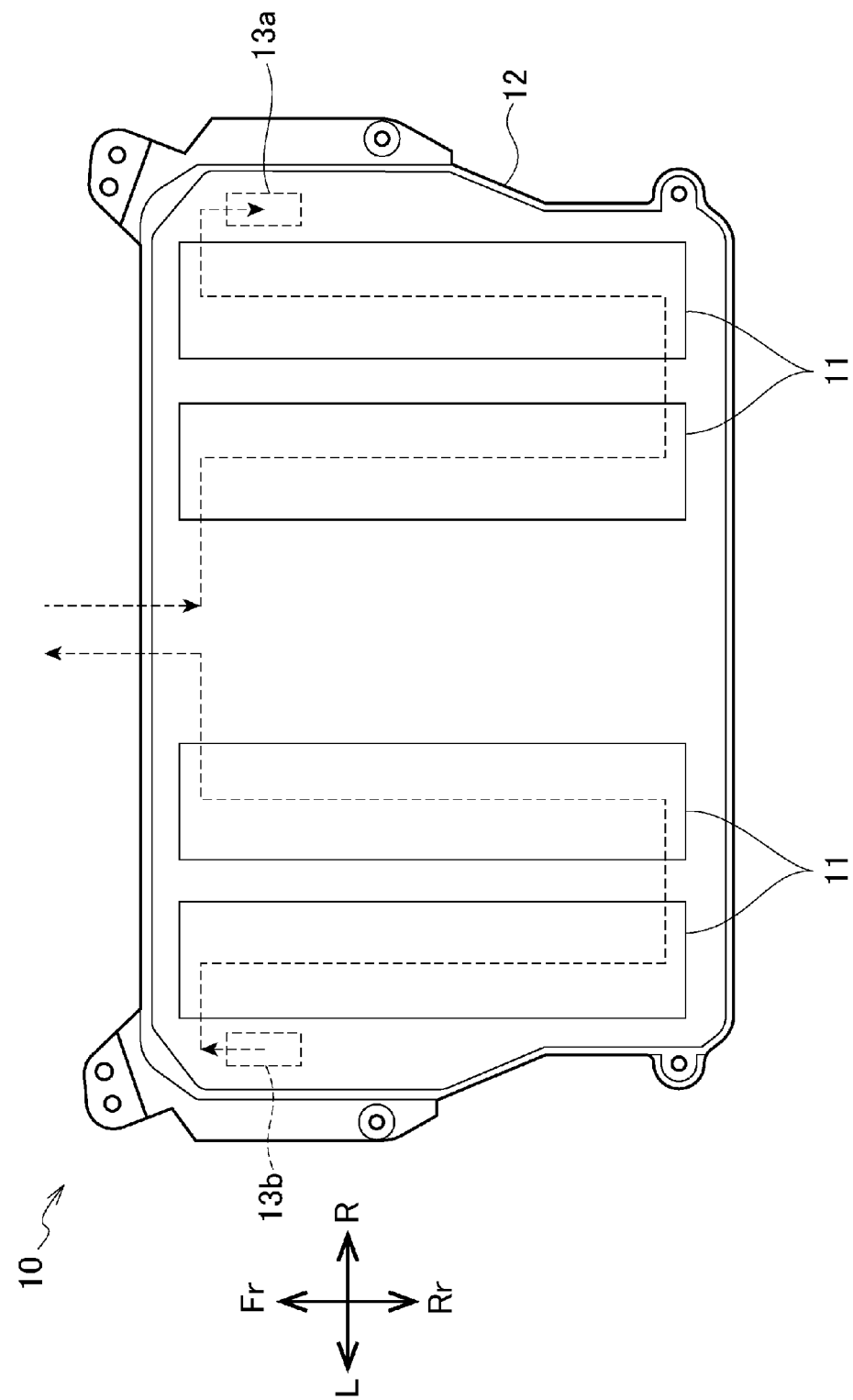
FIG. 3 is a plan view of a state in which a first battery case cover of a first battery pack shown in FIG. 1 is removed.

As shown in FIGS. 2 and 3, the first battery pack 10 includes a plurality of (four in this example) battery modules 11, a first battery case body 12 that houses the battery module 11, and a first battery case cover 13 that closes an opening of the first battery case body 12.

Figure 4:
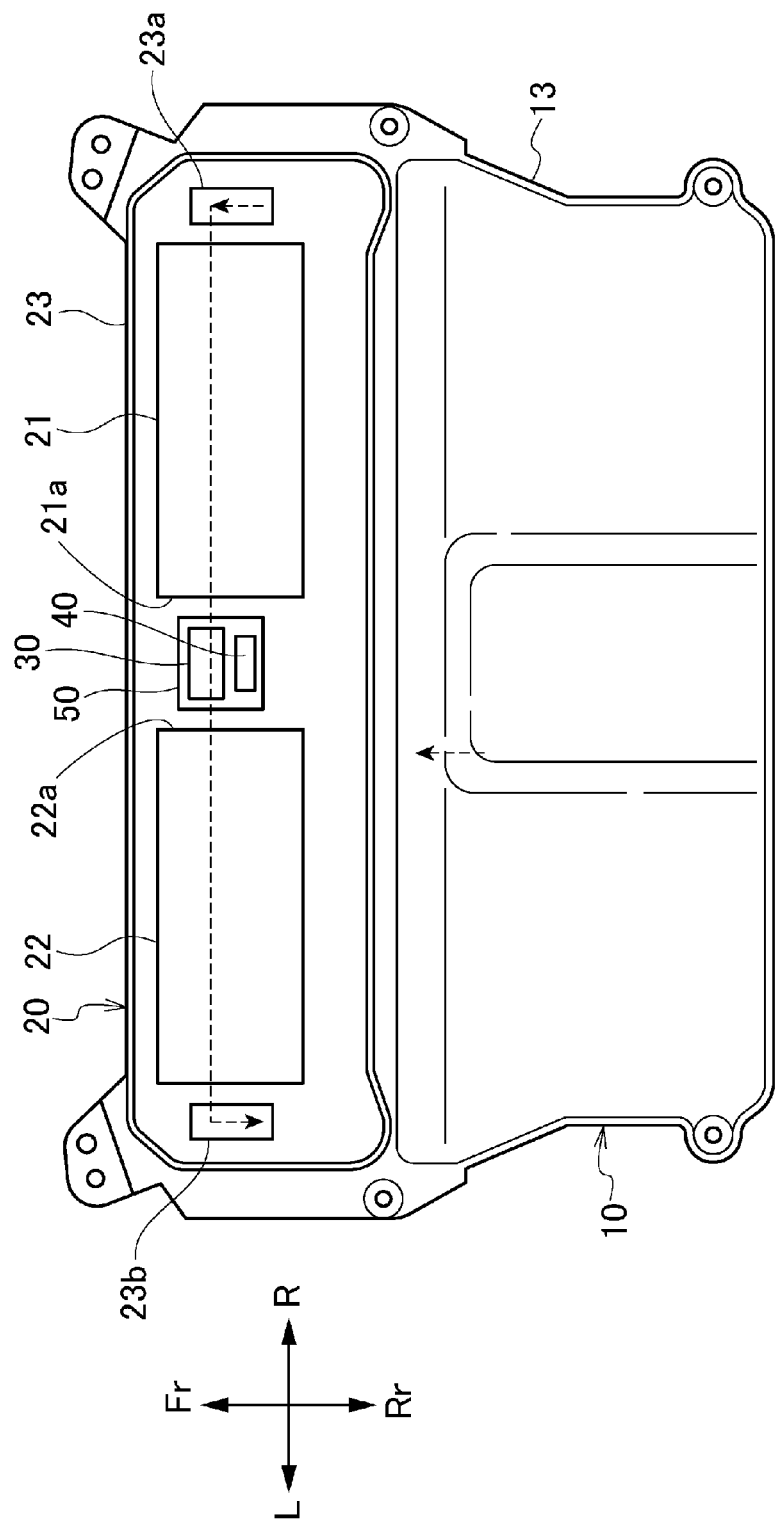
FIG. 4 is a plan view of a state in which a second battery case cover of the battery unit of FIG. 1 is removed.

As shown in FIGS. 2 and 4, the second battery pack 20 includes a second battery case body 23 that houses or carries a first battery module 21 and a second battery module 22, and a second battery case cover 24 that covers the second battery case body 23. The first battery module 21 and the second battery module 22 are provided side by side in the left and right direction, so that an end 21a on a positive electrode side or a negative electrode side of the first battery module 21 faces an end 22a on a negative electrode side or a positive electrode side of the second battery module 22. The first battery module 21 and the second battery module 22 of the second battery pack 20 and the battery module 11 of the first battery pack 10 are connected in series. Dotted lines in FIGS. 3 and 4 indicate the electrical flows of the battery modules 11, 21, and 22 which are electrically connected in series.

The second battery case body 23 accommodates a power shutdown portion 30 that shuts down an electric circuit of the battery unit 1, a cover removal restricting portion 40 that restricts removal of the second battery case cover 24, and an interlock mechanism 50 that disables release of the cover removal restricting portion 40 unless the electric circuit of the battery unit 1 is shut down by the power shutdown portion 30. The power shutdown portion 30, the cover removal restricting portion 40, and the interlock mechanism 50 are disposed between the first battery module 21 and the second battery module 22 in the left-right direction.

As shown in FIGS. 1 and 2, the second battery case cover 24 includes a recess 24a in which a piping or a wiring can be disposed when mounted on a vehicle, at a position between the first battery module 21 and the second battery module 22 in a plan view. The bottom of the recess 24a includes an opening 24b that is accessible to the interlock mechanism 50. The opening 24b is normally closed by a maintenance lid (not shown).

According to the above configuration, at the time of maintenance of the battery unit 1, the interlock mechanism 50 can be accessed from the opening 24b by removing the maintenance lid. By accessing the interlock mechanism 50, after the electric circuit of the battery unit 1 is shut down by the power shutdown portion 30, the cover removal restricting portion 40 can be released. Since the battery module 11 of the first battery pack 10 and the first battery module 21 and the second battery module 22 of the second battery pack 20 are connected in series, the electric circuit of the battery unit 1 can be completely shut down by one power shutdown portion 30. Then, after the electric circuit of the battery unit 1 is completely shut down, the second battery case cover 24 can be removed. In this way, the operator can access the interlock mechanism 50 from the opening 24b so as to easily perform power shutdown processing.

As shown in FIG. 2, the first communication hole 13a and the second communication hole 13b are provided in the vicinity of both ends in the left-right direction of the first battery case cover 13. A first communication hole 23a and a second communication hole 23b that respectively communicate with the first communication hole 13a and the second communication hole 13b of the first battery case cover 13 are provided in the vicinity of both ends in the left-right direction of the second battery case body 23. The battery module 11 of the first battery pack 10 and the first battery module 21 and the second battery module 22 of the second battery pack 20 are electrically connected by a conductive member (for example, a bus bar) (not shown) passing through the first communication holes 13a, 23a and the second communication holes 13b, 23b.

As described above, in the two-story battery unit 1 in which the first battery pack 10 and the second battery pack 20 are arranged above and below, by connecting the battery modules 11, 21, 22 to each other with the conductive member passing through the first communication holes 13a, 23a and the second communication holes 13b, 23b, access to the electric circuit of the battery unit 1 from the outside is prohibited. Further, the first battery case cover 13 of the first battery pack 10 cannot be removed unless the second battery case body 23 of the second battery pack 20 is removed, and the battery module 11 of the first battery pack 10 can be reliably prevented from being accessed without performing power shutdown processing.

(Power Shutdown Portion, Cover Removal Restricting Portion, and Interlock Mechanism)

Figure 5:
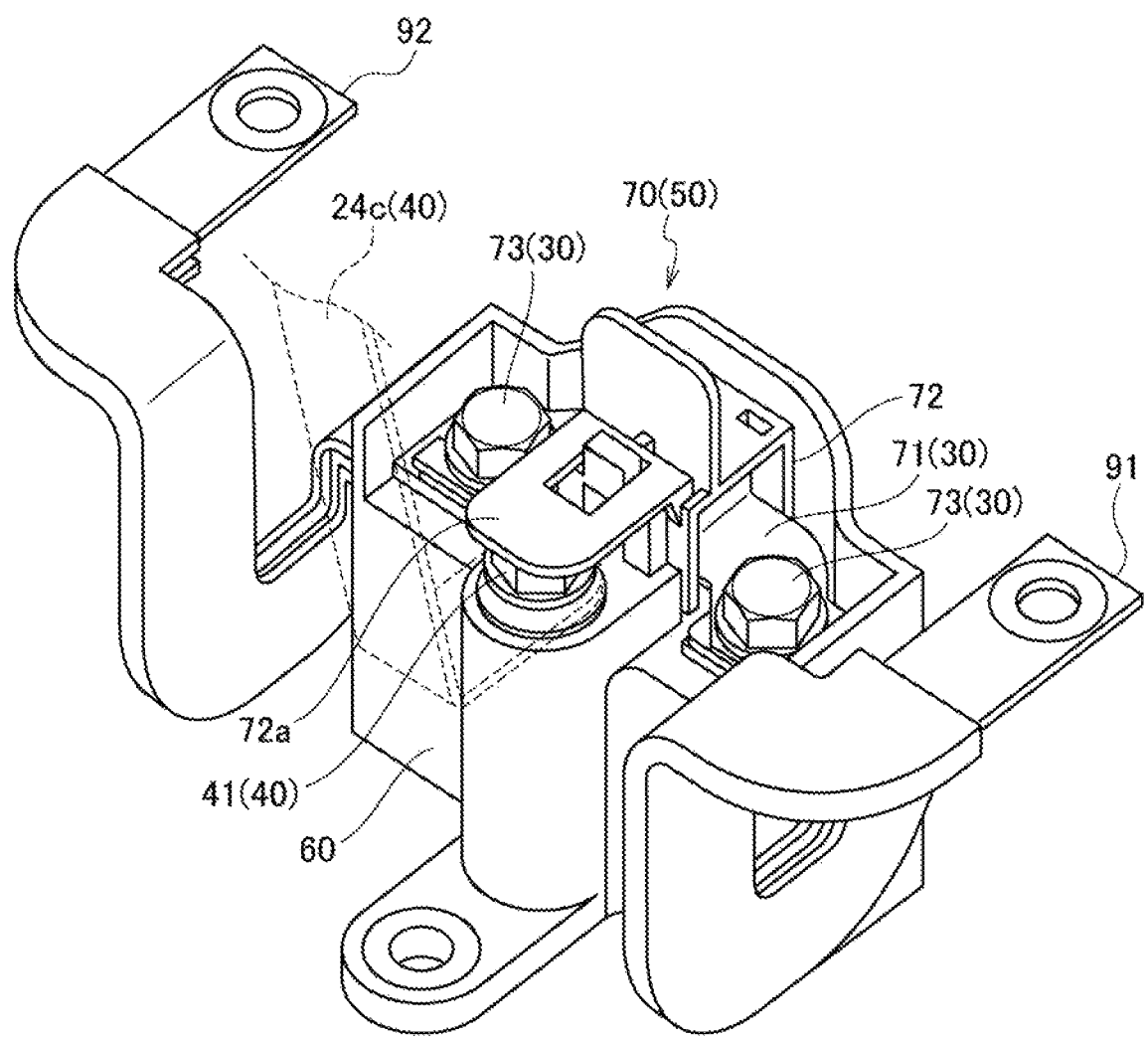
FIG. 5 is a perspective view of a terminal plate including a bus bar unit and a cover removal restricting portion constituting an interlock mechanism of the battery unit of FIG. 1.
Figure 6:
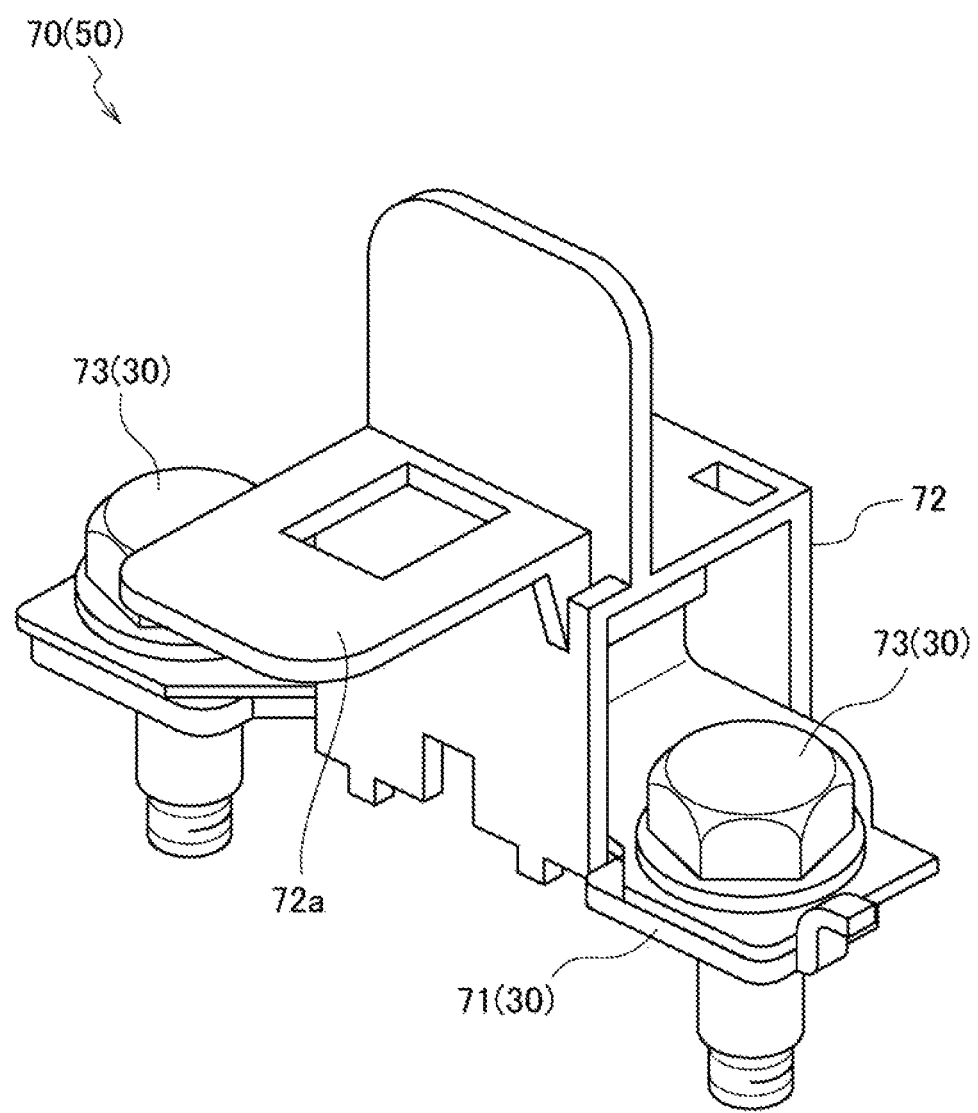
FIG. 6 is a perspective view of the bus bar unit shown in FIG. 5.

Next, an example of the power shutdown portion 30, the cover removal restricting portion 40, and the interlock mechanism 50 will be described with reference to FIGS. 5 and 6.

Between the battery module 21 and the second battery module 22, a bus bar 91 connected to the battery module 21 and a bus bar 92 connected to the second battery module 22 are provided on the terminal plate 60, and the bus bars 91 and 92 are electrically connected to each other by a bus bar 71 of a bus bar unit 70.

A cover fixing bolt 41 that fastens a cover coupling portion 24c extending from the second battery case cover 24 is fastened to the terminal plate 60. The cover coupling portion 24c is formed, for example, so as to extend from a part of an edge toward an opening region of the opening 24b. The second battery case cover 24 can be removed by removing the cover fixing bolt 41 and releasing fastening between the terminal plate 60 and the cover coupling portion 24c. That is, the cover coupling portion 24c and the cover fixing bolt 41 constitute the cover removal restricting portion 40.

The bus bar unit 70 includes the bus bar 71 electrically connecting the bus bar 91 connected to the first battery module 21 and the bus bar 92 connected to the second battery module 22, an insulating bus bar cover 72 provided so as not to be removable from the bus bar 71, and a pair of bus bar fixing bolts 73 that fix both ends of the bus bar 71 to the bus bars 91 and 92. The bus bar 71 and the bus bars 91 and 92 are electrically connected to one another by being fastened to the terminal plate 60 by the bus bar fixing bolts 73. By loosening the bus bar fixing bolt 73 and releasing contact of the bus bar 71 with respect to the bus bars 91 and 92, the electric circuit of the battery unit 1 is completely shut down, and the bus bar unit 70 can be removed from the terminal plate 60. That is, the power shutdown portion 30 includes the bus bar 71 and the bus bar fixing bolts 73.

The bus bar cover 72 has a shielding portion 72a that covers the cover fixing bolt 41. The shielding portion 72a is configured to block the cover fixing bolt 41 from being removed from the terminal plate 60. Therefore, the operator cannot access the cover fixing bolt 41 unless the bus bar fixing bolts 73 are removed and the bus bar unit 70 including the bus bar cover 72 is removed as a whole from the terminal plate 60. That is, the bus bar unit 70 constitutes the interlock mechanism 50.

According to this configuration, unless the bus bar fixing bolt 73 is loosened and the bus bar unit 70 is removed from the terminal plate 60 so as to release the electrical connection state between the first battery module 21 and the second battery module 22, the cover fixing bolt 41 cannot be removed from the terminal plate 60 to release the cover removal restricting portion 40. Therefore, since the second battery case cover 24 is restricted from being removed in a state in which the electric circuit of the battery unit 1 is not shut down, it is possible to prevent the operator from contacting the electric circuit of the battery unit 1 in the state in which the electric circuit of the battery unit 1 is not shut down. A known service plug may be used instead of the bus bar unit 70.

(Cooling Mechanism)

Figure 7:
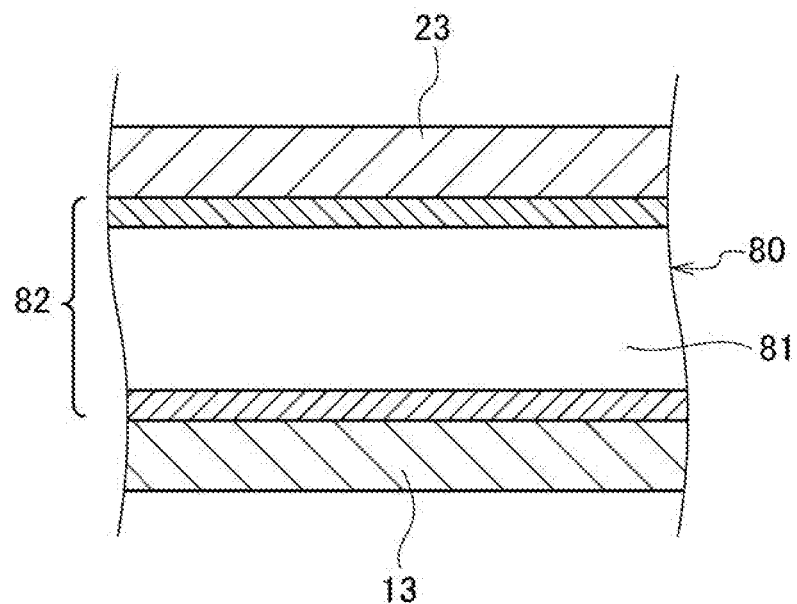
FIG. 7 is a partial cross-sectional view of a battery unit showing an example of a cooling mechanism.
Figure 8:
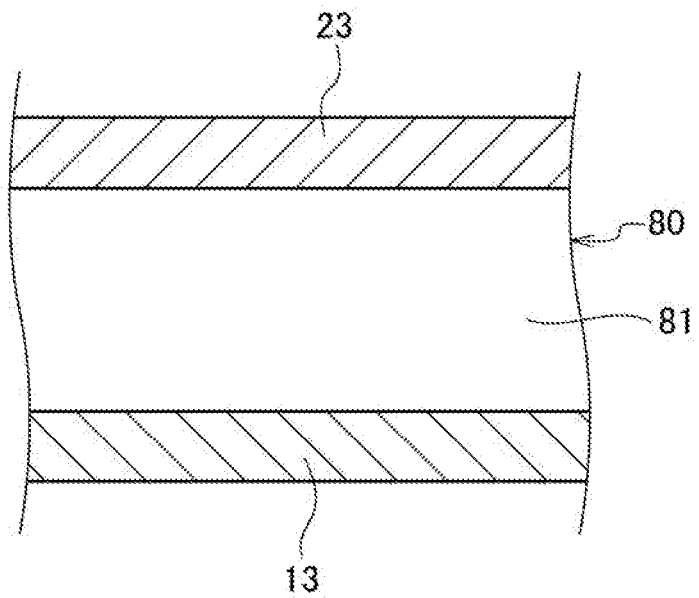
FIG. 8 is a partial cross-sectional view of a battery unit showing another example of a cooling mechanism.

The battery unit 1 preferably includes a cooling mechanism 80. The cooling mechanism 80 is constituted by forming a cooling flow path 81 through which a refrigerant is to flow between the first battery case cover 13 and the second battery case body 23. As shown in FIG. 7, the cooling flow path 81 may be formed by separately providing a water jacket 82 through which a refrigerant is to flow between the first battery case cover 13 and the second battery case body 23, and may be formed by sealing a space between the first battery case cover 13 and the second battery case body 23 as shown in FIG. 8. According to these configurations, by forming the cooling flow path 81 between the first battery case cover 13 and the second battery case body 23, the first battery pack 10 and the second battery pack 20 can be cooled by the refrigerant flowing through the cooling flow path 81. Further, since it is not necessary to arrange the cooling flow path in the internal spaces of the first battery pack 10 and the second battery pack 20, it is possible to prevent the battery module 11, the first battery module 21, and the second battery module 22 from being wetted.

The above embodiment may be appropriately modified, improved, or the like. For example, a plurality of battery modules are respectively accommodated in the first battery pack 10 and the second battery pack 20 in the above embodiment, but it is acceptable as long as at least one battery module is accommodated in the first battery pack 10 and the second battery pack 20.

In the above embodiment, in the bus bar unit 70, the cover coupling portion 24c is attached to the terminal plate 60 which is the accommodated article of the second battery pack 20, but the cover coupling portion 24c may be fastened to the first battery module 21 and/or the second battery module 22, and the cover coupling portion 24c may be fastened to the second battery case body 23. That is, the shielding portion 72a may restrict the cover coupling portion 24c from being removed from the first battery module 21 and/or the second battery module 22, and may restrict the cover coupling portion 24c from being removed from the second battery case body 23. As a result as well, the second battery case cover 24 is restricted from being removed in a state in which the electric circuit of the bus bar unit 70 is energized.

At least the following matters are described in the present specification. Corresponding components in the above-described embodiments are shown in parentheses, without being limited thereto.

(1) A battery unit (the battery unit 1) which includes a first battery pack (the first battery pack 10) and a second battery pack (the second battery pack 20) that is disposed above the first battery pack, in which the first battery pack includes a battery module (the battery module 11), and a first battery case body (the first battery case body 12) and a first battery case cover (the first battery case cover 13) that house the battery module, in which the second battery pack includes a battery module (the first battery module 21, the battery module 22), and a second battery case body (the second battery case body 23) and a second battery case cover (the second battery case cover 24) that house the battery module, in which the second battery case body houses:
a power shutdown portion (the power shutdown portion 30) configured to shut down an electric circuit of the battery unit;
a cover removal restricting portion (the cover removal restricting portion 40) configured to restrict removal of the second battery case cover; and
an interlock mechanism (the interlock mechanism 50) configured to disable release of the cover removal restricting portion unless the electric circuit is shut down by the power shutdown portion, and in which the second battery case cover includes an opening (the opening 24b) accessible to the interlock mechanism.

According to (1), in the two-story battery unit in which the first battery pack and the second battery pack are arranged above and below, by providing the power shutdown portion that shuts down the electric circuit of the battery unit on the second battery case body located on a second story, the number of the power shutdown portions may be one, and the power shutdown processing of the operator is facilitated. Further, by providing the opening accessible to the interlock mechanism on the battery case cover of the second battery pack located on the second floor, the power shutdown processing of the operator is further facilitated.

(2) In the battery unit according to (1),
the battery module of the first battery pack and the battery module of the second battery pack are connected in series.

According to (2), since the battery module of the first battery pack and the battery module of the second battery pack are connected in series, the electric circuit of the battery unit can be completely shut down by one power shutdown portion.

(3) In the battery unit according to (2),
the first battery case cover and the second battery case body include communication holes through which internal spaces communicate with each other (the first communication holes 13a, 23a, the second communication holes 13b, 23b), and
the battery module of the first battery pack and the battery module of the second battery pack are electrically connected to each other by a conductive member passing through the communication holes.

According to (3), in the two-story battery unit in which the first battery pack and the second battery pack are arranged above and below, by connecting the battery modules to each other with the conductive member passing through the communication holes through which the internal spaces communicate with each other, access to the electric circuit of the battery unit 1 from the outside is prohibited. Further, since the second battery pack is arranged above the first battery pack, the first battery case cover of the first battery pack cannot be removed unless the second battery case body of the second battery pack is removed, and the battery module of the first battery pack can be reliably prevented from being accessed without performing power shutdown processing.

(4) In the battery unit according to (3),
the second battery pack includes a first battery module (the first battery module 21) and a second battery module (the second battery module 22) that are arranged side by side,
the interlock mechanism is arranged between the first battery module and the second battery module, and
the communication holes include first communication holes (the first communication holes 13a, 23a) and second communication holes (the second communication holes 13b, 23b) respectively disposed on both sides with the first battery module, the interlock mechanism, and the second battery module interposed therebetween.

According to (4), the first communication holes, the first battery module, the interlock mechanism, the second battery module, and the second communication holes are arranged in this order, and thus can be laid out efficiently.

(5) In the battery unit according to (4),
the power shutdown portion includes:

a bus bar (the bus bar 71) that electrically conducts the first battery module and the second battery module; and
a bus bar fixing bolt (the bus bar fixing bolts 73) that fixes the bus bar,
the cover removal restricting portion includes:
a cover coupling portion (the cover coupling portion 24c) that extends from the second battery case cover; and
a cover fixing bolt (the cover fixing bolt 41) that fastens an accommodated article (the terminal plate 60) accommodated in the second battery pack or the second battery case body and the cover coupling portion, and
the interlock mechanism includes:
a bus bar cover (the bus bar cover 72) provided so as not to be removable from the bus bar and having a shielding portion (the shielding portion 72a) configured to shield the cover coupling portion from being removed from the accommodated article or the second battery case body.

According to (5), an interlock structure can be realized with a simple configuration without using an already existing product such as a service plug.

(6) In the battery unit according to any one of (1) to (5), a cooling flow path (the cooling flow path 81) through which a refrigerant is to flow is formed by the first battery case cover and the second battery case body.

According to (6), since the cooling flow path is formed by the first battery case cover and the second battery case body, the first battery pack and the second battery pack can be cooled by the refrigerant flowing through the cooling flow path. Further, since it is not necessary to arrange the cooling flow path in the internal spaces of the first battery pack and the second battery pack, it is possible to prevent the battery module of the first battery pack and the battery module of the second battery pack from being wetted.

(7) In the battery unit according to any one of (1) to (5), a water jacket (the water jacket 82) through which a refrigerant is to flow is provided between the first battery case cover and the second battery case body.

According to (7), since the water jacket is formed between the first battery case cover and the second battery case body, the first battery pack and the second battery pack can be cooled by the refrigerant flowing through the water jacket. Further, since it is not necessary to arrange the cooling flow path in the internal spaces of the first battery case and the second battery case, it is possible to prevent the battery module of the first battery pack and the battery module of the second battery pack from being wetted.

(8) In the battery unit according to any one of (4) to (7), the second battery pack includes a first battery module (the first battery module 21) and a second battery module (the second battery module 22) that are arranged in parallel,
the second battery case cover includes a recess (the recess 24a) at a position that is between the first battery module and the second battery module in a plan view,
the opening is provided in the recess, and
a piping or a wiring is disposed in the recess.

According to (8), by providing the second battery case cover with the recess at a position that is between the first battery module and the second battery module in a plan view, and disposing a piping or a wiring in the recess, the space between the first battery module and the second battery module can be used effectively.

The invention claimed is:

1. A battery unit comprising a first battery pack and a second battery pack that is disposed above the first battery pack,
wherein the first battery pack includes:
a battery module; and
a first battery case body and a first battery case cover that house the battery module,
wherein the second battery pack includes:
a battery module; and
a second battery case body and a second battery case cover that house the battery module,
wherein the second battery case body houses:
a power shutdown portion configured to shut down an electric circuit of the battery unit;
a cover removal restricting portion configured to restrict removal of the second battery case cover; and
an interlock mechanism configured to disable release of the cover removal restricting portion unless the electric circuit is shut down by the power shutdown portion, and
wherein the second battery case cover includes an opening accessible to the interlock mechanism.

2. The battery unit according to claim 1,
wherein the battery module of the first battery pack and the battery module of the second battery pack are connected in series.

3. The battery unit according to claim 2,
wherein the first battery case cover and the second battery case body include communication holes through which internal spaces communicate with each other, and
wherein the battery module of the first battery pack and the battery module of the second battery pack are electrically connected to each other by a conductive member passing through the communication holes.

4. The battery unit according to claim 3,
wherein the second battery pack includes a first battery module and a second battery module that are arranged side by side,
wherein the interlock mechanism is arranged between the first battery module and the second battery module, and
wherein the communication holes include first communication holes and second communication holes respectively disposed on both sides with the first battery module, the interlock mechanism, and the second battery module interposed therebetween.

5. The battery unit according to claim 4,
wherein the power shutdown portion includes:
a bus bar that electrically conducts the first battery module and the second battery module; and
a bus bar fixing bolt that fixes the bus bar,
wherein the cover removal restricting portion includes:
a cover coupling portion that extends from the second battery case cover; and
a cover fixing bolt that fastens an accommodated article accommodated in the second battery pack or the second battery case body and the cover coupling portion, and
wherein the interlock mechanism includes:
a bus bar cover provided so as not to be removable from the bus bar and having a shielding portion configured to shield the cover coupling portion from being removed from the accommodated article or the second battery case body.

6. The battery unit according to claim 1,
wherein a cooling flow path through which a refrigerant is to flow is formed by the first battery case cover and the second battery case body.

7. The battery unit according to claim 1,
wherein a water jacket through which a refrigerant is to flow is provided between the first battery case cover and the second battery case body.

8. The battery unit according to claim 4,
wherein the second battery pack includes a first battery module and a second battery module that are arranged side by side,
wherein the second battery case cover includes a recess at a position that is between the first battery module and the second battery module in a plan view,
wherein the opening is provided in the recess, and
wherein a piping or a wiring is disposed in the recess.

* * * * *